United States Patent [19]

Bakke

[11] 4,324,770

[45] Apr. 13, 1982

[54] PROCESS FOR DRY SCRUBBING OF FLUE GAS

[75] Inventor: Even Bakke, Stamford, Conn.

[73] Assignee: Peabody Process Systems, Inc., Stamford, Conn.

[21] Appl. No.: 189,026

[22] Filed: Sep. 22, 1980

[51] Int. Cl.$^3$ ............................................. C01B 17/00
[52] U.S. Cl. ..................................... 423/242; 423/244
[58] Field of Search .......... 423/242 A, 242 K, 244 A, 423/244 R

[56] References Cited

U.S. PATENT DOCUMENTS

| | | | |
|---|---|---|---|
| 3,929,968 | 12/1975 | Taub | 423/242 |
| 3,995,005 | 11/1976 | Teller | 423/244 |
| 4,081,513 | 3/1978 | Moss | 423/244 |
| 4,273,750 | 6/1981 | Hollett et al. | 423/244 |
| 4,279,873 | 7/1981 | Felsuang et al. | 423/242 |

*Primary Examiner*—O. R. Vertiz
*Assistant Examiner*—Gregory A. Heller
*Attorney, Agent, or Firm*—St. Onge, Steward, Johnston & Reens

[57] ABSTRACT

A flue gas dry scrubbing process and system achieves higher sulfur dioxide removal efficiency with a better utilization of alkali reagent chemicals as well as increased dry product recovery performance using a combination of spray drying with an alkali reagent slurry and with a recycled stream comprising a mixture of unreacted alkali, sulfite and sulfate reaction products and flyash which directly contacts the sulfur dioxide-containing flue gas. Preferably the recycled mixture contacts the flue gas in the spray dryer. The invention utilizes a splitting method and a splitter apparatus wherein the particle product powder is separated into two fractions for recycling and for product disposal. The rate of splitting is fully adjustable over a wide range.

7 Claims, 3 Drawing Figures

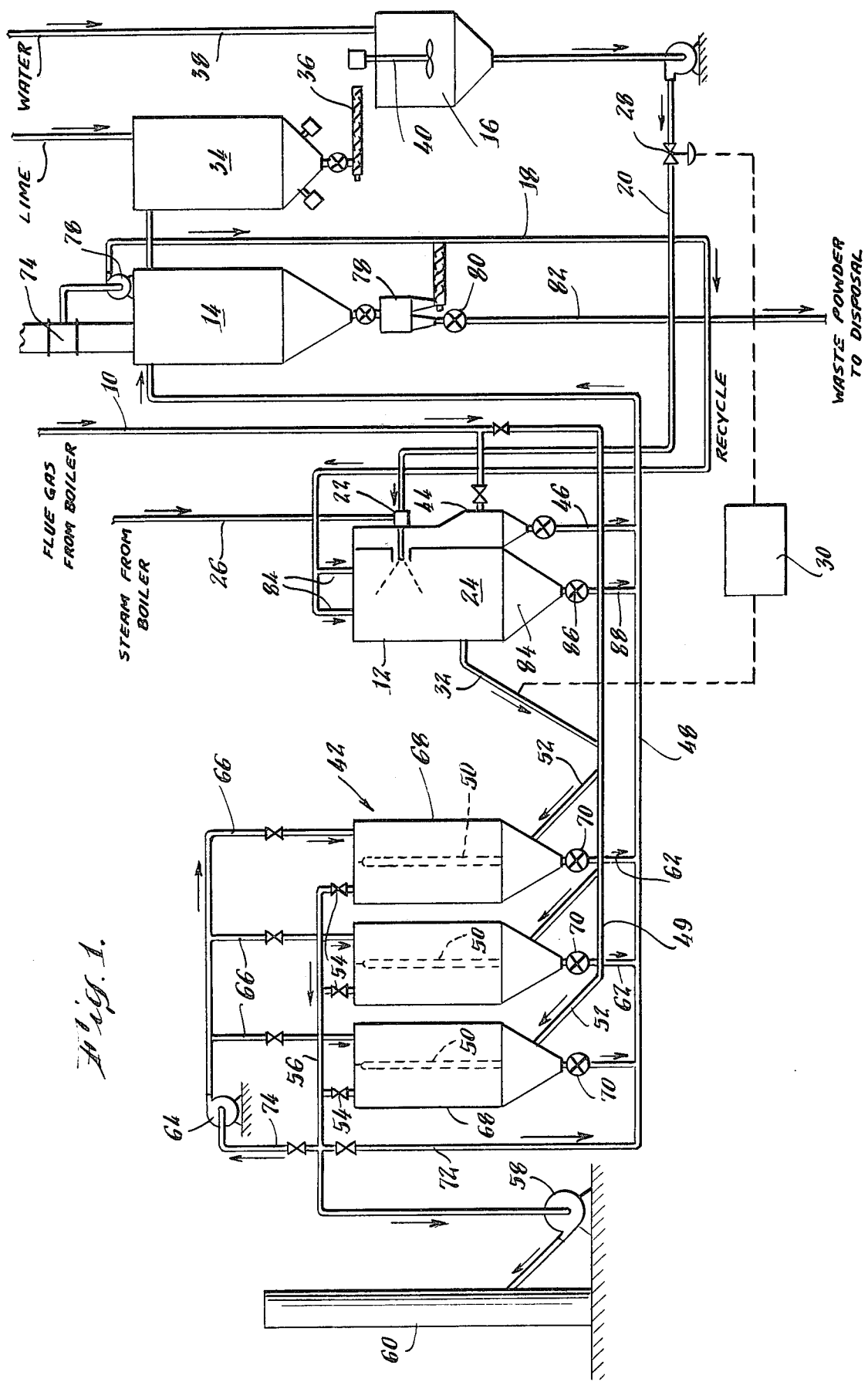

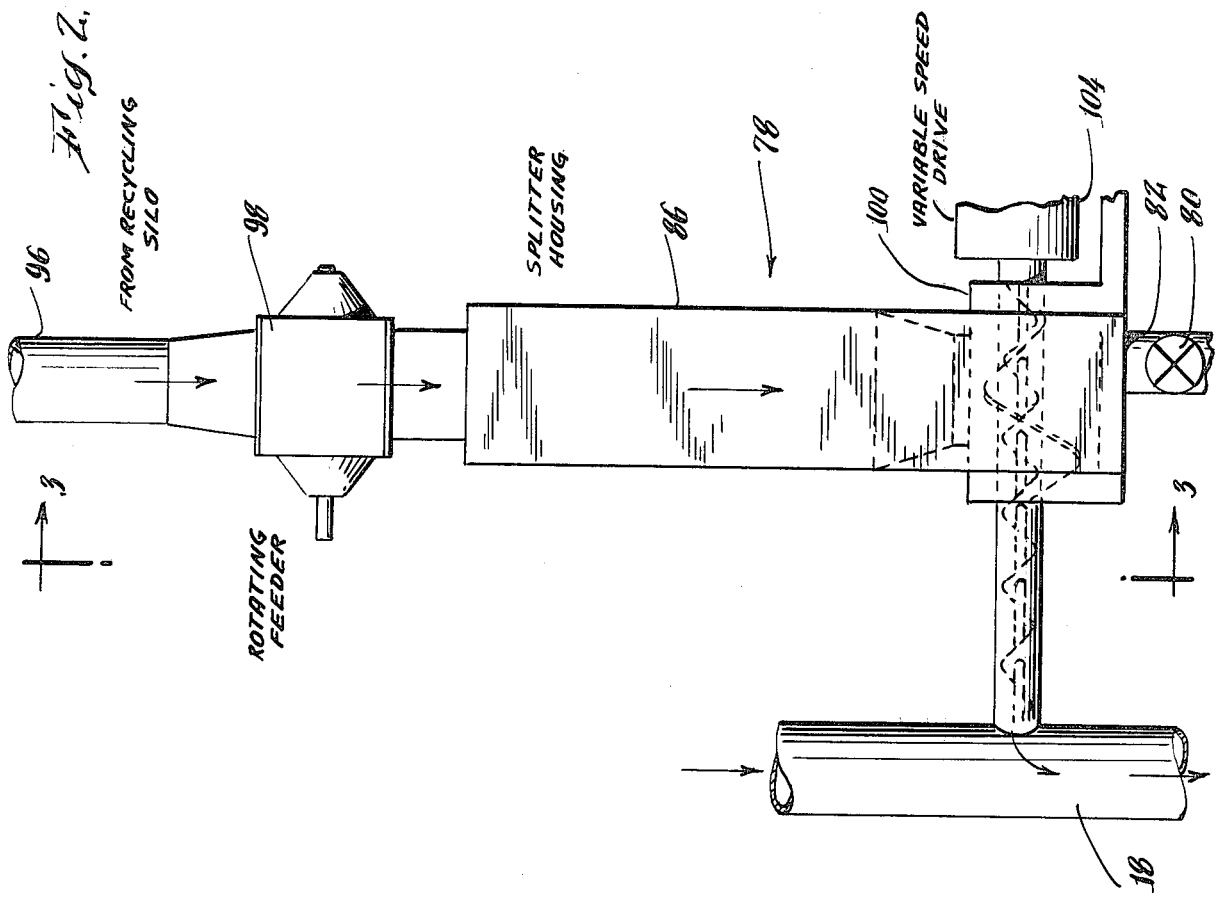
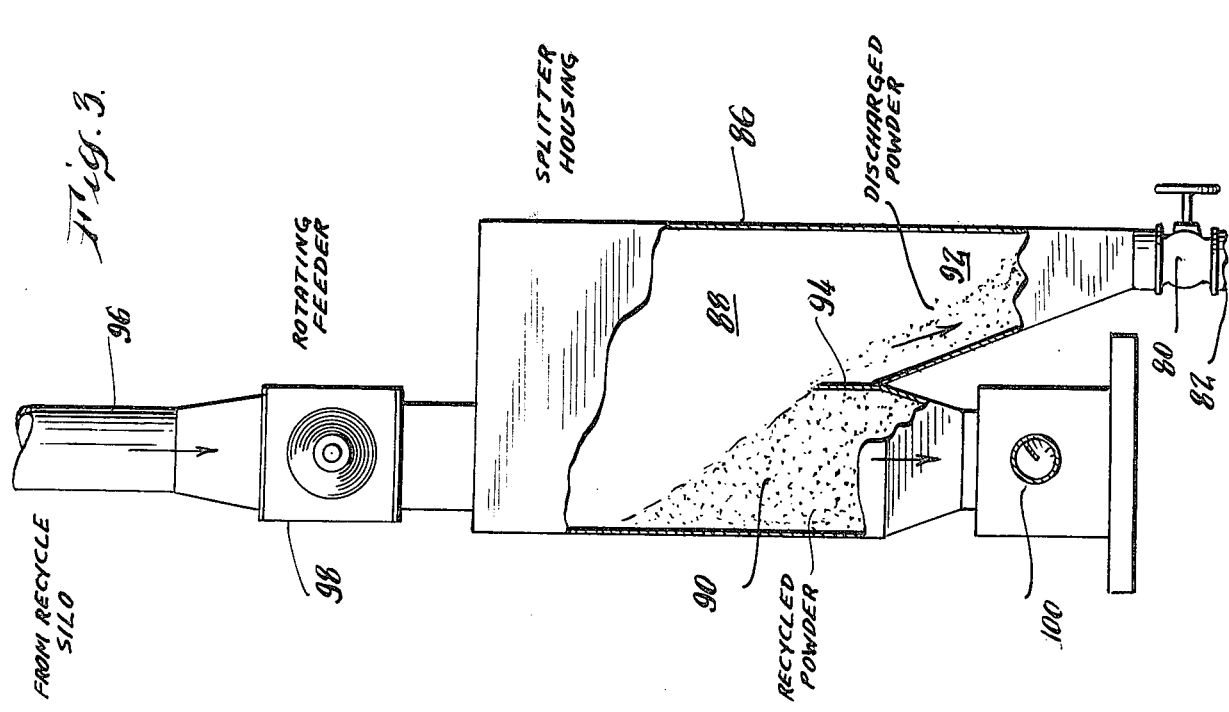

PROCESS FOR DRY SCRUBBING OF FLUE GAS

BACKGROUND OF THE INVENTION

1. Field of the Invention

This invention relates to the removal of sulfur dioxide and particulate material from boiler flue gases. In particular, this invention relates to a process and system for dry scrubbing desulfurization of flue gases using soda ash, lime, or similar alkali reagents.

2. Description of the Prior Art

The wet scrubbing of boiler flue gases with alkali slurries to remove sulfur dioxide is well known. Although wet scrubbers are effective and have enjoyed wide application, a drawback associated with their use is the difficulty of waste product disposal. That is, the common by-product of the desulfurization of flue gases by wet scrubbing is sludge which may contain up to 50 weight percent water. Sludge requires comparatively expensive disposal means, such as on site settling ponds or costly transportation to remote disposal sites, as well as some stabilization expenses.

In order to overcome this disadvantage of wet scrubbing, it has been proposed to utilize a dry product system in which an atomized solution or slurry of alkali reactant is mixed with flue gas in a spray dryer so that the sulfur dioxide contained in the flue gas is absorbed on the surface of fine drops in the atomized spray and the alkali material reacts with the sulfur dioxide to form sulfite and sulfate compounds. A dry powder mixture of these compounds, with residual unreacted alkali, is formed as a result of the thermal energy of the flue gas. The flue gas, containing a particulate mixture of the reaction products, unreacted alkali and any flyash originally present, exits the spray dryer and is transported to dust removal equipment such as a fabric filter or electrostatic precipitator. The cleaned gas is then exhausted and the particulates are removed from the dust collector hoppers in a dry form for disposal.

It is stated that advantages of dry scrubbers over wet scrubbers include simplicity of operation, lower capital costs for systems, smaller energy demands of operation as well as easier transportation and handling of dry wastes for end product disposal. Environmental requirements may also be more readily met by such systems.

In the articles "Two-State Dry Scrubbers Come of Age Interest Booms, Orders Start Coming In", *Electric Light and Power,* September, 1978, pp. 49–50, and "Tests of a Two-Stage Combined Dry Scrubber/SO$_2$ Absorber Using Sodium or Calcium", *Combustion,* November 1978, pp. 30–43, a dry scrubbing system is described. In that system, boiler flue gas enters a spray dryer where a mist with a dilute reagent solution or slurry is sprayed through the gas. Quick chemical reaction is said to remove a substantial portion of the sulfur dioxide from the flue gas while the heat in the gas evaporates the water and dries the solution to form a dry powder. Flue gas containing the dry powder and flyash leaves the spray dryer and enters either a precipitator or fabric filter dry collector where, it is said, additional reaction of the sulfur dioxide takes place as the flyash and powder are removed from the gas in the collector. The clean gas is then exhausted to a stack while flyash and sulfur dioxide-containing powder particulates are removed from the collector hoppers in dry form for disposal. Among the dry solids recovered are the reagent materials, such as lime, which may be recycled as absorbent feed to the slurry feed tank to be mixed with make-up lime slurry before being atomized in the spray dryer for further use.

The prior art dry scrubbing systems are currently essentially still in the pilot testing stage. In *Fabric Filter Newsletter,* Nov. 10, 1978; No. 37, pp. 3–4, it is stated that 90 percent sulfur dioxide collection may be achieved using either soda ash or lime as a reagent. With soda ash, this level of sulfur dioxide removal is said to be obtained with a stoichiometric ratio of 1.0 to 1.2 while using lime as an absorbent required a stoichiometry of between 2.3 and 3.0 for the same removal efficiency. With recirculation of dried and partially reacted product and flyash from the spray dryer and filter bag house to the feed tank for mixing with make-up lime slurry before being again atomized, lime utilization is said to be increased with a 90 percent removal efficiency allegedly being obtained with a stoichiometry in the range of 1.3 to 1.7.

Although the prior art dry scrubbing systems present the inherent advantages that dry scrubbing provides over wet scrubbing, they nevertheless incur high reagent costs due to the high stoichiometric ratios of reagent to sulfur dioxide required to obtain the desired removal efficiency. For example, lime removal efficiencies of 90 percent are attained only at undesirably low utilization efficiencies. This is a particular drawback where sulfur contents in coal are high, such as above about 1.4 percent. Also, where filter bag house, or other dust collector, discharge powder is recycled to the feed tank, the amount of recycle is severely limited by the amount of water which can be used, which is determined by the inlet and outlet temperatures of the spray dryer, and the upper limit of slurry concentration which the spray dryer atomizer can accept.

Thus, there exists a need for dry scrubbing processes and systems which possess increased efficiencies and result in reduced reactant costs and, concurrently, decreased waste amounts and reduced disposal costs.

SUMMARY OF THE INVENTION

The present invention provides an improvement over the dry scrubbing processes and systems now known by achieving higher sulfur dioxide removal efficiency with an improved stoichiometry and thus a better utilization of alkali reagent chemicals as well as increased dry product recovery performance. This is achieved, according to the invention, in a process and system using a combination of spray drying with an alkali reagent slurry and dry scrubbing with a recycled dry powder stream comprising a mixture of unreacted alkali, sulfite and sulfate reaction products and flyash. The recycled stream is recycled as a powder suspension in the flue gas and is injected into the top of the spray drying chamber until it falls virtually downwards through the spray zone produced by the atomizer.

Accordingly, a feature of this invention is the provision of a process and system for the removal of sulfur dioxide from flue gases using spray drying and dry scrubbing with recycling.

Several advantages result from the process and system of this invention. These include a higher sulfur dioxide removal efficiency and improved stoichiometry than that obtainable with the known methods. In addition, the amount of recycled powder can be adjusted and the same alkali caused to pass through the spray dryer many times with greatly increased exposure to sulfur dioxide in the flue gas. Thus, the alkali reagent, such as lime, is better utilized so that there is a lower consumption of the chemicals as a consequence of the increased reagent total exposure time. Furthermore, by conveying the recycled powder mixture at relatively high velocity in the conveying pipes, there is a further advantage of a continuous creation of fresh surface area as a consequence of powder fracture and alkali particle attrition and hence an additional lowering of chemical consumption. Another advantage is that most flyash contains alkali such as CaO, MgO, $Al_2O_3$, $Na_2O$, $K_2O$, and the like. By recycling a large amount of flyash, these alkali will react with sulfur dioxide and, thereby, also reduce the required feed of alkali reagent chemical.

The process and system of this invention have the inherent advantage that temperature control becomes less critical. That is, since a large amount of powder is recycled, the amount of water into the atomizer can be reduced, thereby operating at a higher outlet temperature. This will reduce the chance of making the filter bag in the dust collection baghouse wet. Also, by introducing the recycled dry powder mixture into the slurry droplet zone at the spray dryer, the powder will have a drying effect and the chance of wetting the walls in the spray dryer chamber, and thereby causing particle buildup on the walls, will be significantly reduced.

A further feature of this invention is the provision of a process and system for dry scrubbing of flue gases with spray drying wherein reacted and unreacted reagent alkali and flyash are recycled and directly contact, in the dry state, sulfur dioxide containing gas in the spray dryer chamber.

The process and system of this invention utilize a splitting method and a splitter apparatus wherein the particulate product powder is separated into fractions one of which is recycled and one of which proceeds to product disposal. The rate of splitting is fully adjustable over a wide range.

Thus, another feature of the invention is the provision of a method and apparatus for separating part of the dry product into a recycle stream and a disposal stream.

The foregoing and other features, advantages and objects of this invention will be further apparent from the following description of the preferred embodiments herein taken in conjunction with the accompanying drawings.

BRIEF DESCRIPTION OF THE DRAWINGS

FIG. 1 is an illustration, in schematic form, of an overall system for dry scrubbing of flue gas according to an embodiment of this invention;

FIG. 2 is a rear elevational view of a splitter apparatus for the system according to an embodiment of this invention; and FIG. 3 is a side view taken along the line 3—3. with a portion broken away for greater clarity, of the splitter apparatus of FIG. 2.

DESCRIPTION OF THE PREFERRED EMBODIMENT

Referring to FIG. 1, there is shown a system for dry scrubbing of flue gas according to a preferred embodiment of this invention. Flue gas from a boiler enters the system through a duct 10 and is transported to a spray dryer 12 where it is contacted with unreacted and recycled alkali. The alkali, in this instance lime, is fed to the spray dryer 12 from the recycle silo 14 and the lime slurry preparation tank 16 through the feed lines 18 and 20, respectively.

Fresh lime slurry from the lime slurry preparation tank 16 is pumped to the spray dryer 12 through the pipe 20 to an atomizing nozzle 22 and into a spray drying chamber 24. Steam from the boiler also enters the atomizing nozzle 22, through the pipe 26, and breaks up the lime slurry into small droplets. The rate of fresh lime slurry feed is controlled by a valve 28 which is controlled by a temperature controller 30 which senses temperature in the duct 32 exiting the spray dryer 12.

Fresh lime slurry is prepared in the lime slurry preparation tank 16 by feeding lime from the lime storage silo 34 through the metering lime feed screw conveyor 36 to the top of the lime slurry preparation tank 16. Water is added to the dry lime powder through the pipe 38 and the two mixed by means of the stirrer 40.

Sulfur dioxide in the flue gas is absorbed on the surface of the lime slurry droplets which form as a dispersed spray of fine alkali slurry containing droplets as a result of the atomizing nozzle 22. The sulfur dioxide reacts with the lime in the droplets, in the spray drying chamber 24, to form calcium sulfites and calcium sulfates. At the same time, the heat of the flue gas evaporates the water in the droplets to produce a dry powder mixture of those reaction products and of unreacted lime. As the slurry droplet water evaporates the flue gas temperature is reduced.

The flue gas, which now contains a mixture of particulate solids including the reaction products, unreacted lime, and flyash which may remain present, exits the spray dryer 12 through the duct 32 and is transported to a dust collection system referred to generally at 42. Some of the particulate solids fall out in the hopper 84 of the spray drying vessel 12 and some in the hopper near the point where the flue gas enters the spray drying chamber 24, shown at 44, and collect in the bottom of the spray drying vessel 12 as flyash and other solids from whence they are removed through the discharge lines 46 and 88 to enter the solids conveying line 48.

The flue gas and particulate solids stream leaves the spray dryer 12 through the duct 32 and enters the dust collection system 42 where a manifold 49 distributes the steam to fabric filters 50 through inlet conduits 52. The filtered flue gas exits the filter through the conduits 54, enters the outlet manifold 56 and passes to the main ID fan 58 and from there to the stack 60 where it is exhausted as clean flue gas to the atmosphere. The particulate solids removed by the fabric filters 50 are collected and are discharged through the discharge lines 62 which feed them to the solids conveying line 58.

The particulate solids, or dust, collected on the fabric filters 50, in this instance filter bags, are removed by reversing the gas flow through the filter bags with the help of a blower 64 and reverse ducting 66 utilizing the cleaned flue gas. The powder dust falls into the hoppers of filter 68 and is removed by rotary valves 70 to the discharge lines 62.

The powder dust from the collection system 42 is conveyed through the line 48 to the storage silo 14. The gas for the conveying is cleaned hot flue gas which is extracted from the outlet duct 56 of the dust collection system 42 and is split into a stream, 72, for conveying the solids and a stream, 74, for reverse gas flow through the filter bags 50. The use of hot flue gas helps prevent water condensation in the line 48 and ducts 66.

The solids conveying line 48, which also receives solid particulates from the spray dryer 12 through the discharge lines 46 and 88, conveys material to the top of the storage silo 14. The silo 14 is ventilated with a small dust collector 74 and a fan 76 which further transports the hot conveying gas downwards in the duct 18. A splitter apparatus 78 is located at the bottom of the storage silo 14.

The splitter apparatus 78, described in greater detail below with reference to FIGS. 2 and 3, divides the solid particulates in the storage silo 14 into two streams, one of which is injected as recycle powder into the duct 18 and the other of which is removed from the system by the rotary valve 80 and the waste conduit 82 for disposal.

The recycled powder injected into the duct 18 is conveyed by the conveying gas to the top of the spray dryer 12 where it is injected down into the zone of the spray drying chamber 24 by injector pipes 84 located such that the recycled powder is well distributed across the spray drying chamber. The recycled powder falls downward through the spray drying chamber 24 where it is contacted by the flue gas and further sulfur dioxide within the flue gas is absorbed on the unreacted alkali within the recycled powder. A part of the recycled powder will fall into the hopper portion 84 of the spray dryer 12 to be removed therefrom through the rotary valve 86 and the discharge line 88 for feed into the solids conveying line 48. The remaining part of the recycled powder exits the spray dryer with the flue gas through the conduit 32 and is removed therefrom in the dust collection system 42.

The flue gas, pressurized by fan 76, conveys the recycled powder from the silo 14 in the duct 18 at relatively high velocities as a consequence of which the recycled powder fractures and new surfaces are exposed to form reaction sites when it is recycled back into the spray drying chamber 24.

The splitter apparatus 78 for dividing the solid particulates or powder in the storage silo 14 into two streams is shown in greater detail in FIGS. 2 and 3. The splitter apparatus 78 includes a housing 86 which forms an internal compartment 88, the lower portion of which is divided into sections 90 and 92 by means of an internal partial upright wall 94. The splitter compartment 88 receives feed from the silo 14 through the conduit 96 by means of a feeding apparatus such as a rotating dust feeder 98 illustrated. Inside the compartment 88, the particulate solids collect in section 90 and overflow wall 94 into section 92 to constitute recycle powder or waste discharge powder, respectively.

The recycle powder in splitter section 90 is fed into a screw feeder 100 which feeds the recycle powder into the recycle duct 18 where it is propelled by the cleaned hot flue gas pumped from the recycle silo fan 76 as feed to the spray dryer vessel 12. Powder collected in splitter section 92 is discharged to the discharge line 82 by the rotary dust valve 80 for collection in a waste storage silo or other disposal.

The rate of splitting is fully adjustable over a wide range by adjusting the rate of speed of the feed screw 100 through the variable speed drive 104. By adjusting this splitting rate, the amount of recycled powder is adjusted. Typically, the amount of recycled powder can be 10 times the amount of flyash and alkali powder that enters the process originally. As a result, the same alkali is caused to pass through the spray dryer 12 many times and, thereby, its exposure time to the sulfur dioxide in the flue gas is greatly increased.

Those skilled in the art, given the teaching herein, will be able to design the system and process having specific process parameters of gas flow rates, power rates, temperatures, concentrations and equipment types and sizes, depending on the boiler rating, sulfur dioxide concentration in the flue gas and the emission standards desired to be met. It is to be understood that such specific process parameters as well as equipment design characteristics and arrangements are within contemplation of this invention. For example, although the dust collection system utilizes filter bags which are preferred because baghouse operation and performance are generally less sensitive to inlet loading dust, electrostatic precipitation could also be successfully employed. Accordingly, there have been disclosed a system and process for the removal of sulfur dioxide and particulate material from boiler and flue gases utilizing dry scrubbing wherein a portion of the collected solids are recycled in an efficient and advantageous manner.

What is claimed is:

1. In a process for removing sulfur dioxide from flue gas including the steps of feeding the sulfur dioxide-containing flue gas to a spray dryer, contacting the flue gas with an atomized solution of alkali reactant in a spray zone in a spray drying chamber to form sulfite and sulfate reaction products, spray drying the solution and formed materials in the spray drying chamber to obtain dry particles, conveying the flue gas and dry particles to a dry particle collector and removing the dry particles in the dry particle collector, the improvement therein comprising recycling a portion of the dry particles removed in the dry particle collector and contacting the sulfur dioxide containing-flue gas directly with the dry recycled portion of particles.

2. The improved process as claimed in claim 1 wherein the recycled dry particles contact the flue gas in the spray dryer chamber.

3. The improved process as claimed in claim 1 wherein the recycled dry particles are introduced into the top of the spray dryer chamber and fall vertically downward through the spray zone therein.

4. The improved process as claimed in claim 2 or 3 wherein the alkali reactant is lime.

5. The improved process as claimed in claim 2 or 3 wherein the recycled dry particles are conveyed in such a manner that they undergo attrition with creation of fresh particle surface area.

6. The improved process as claimed in claim 1 wherein the dry particles removed in the dry collector are conveyed to a storage silo, transported from the storage silo to a splitter apparatus and separated thereby into a recycle stream and a disposal stream.

7. A process for dry scrubbing of flue gas containing sulfur dioxide and flyash particles comprising contacting the flue gas with recycled gas unreacted alkali reactant and alkali-sulfur dioxide reaction products in a spray dryer, contacting the flue gas with an atomized slurry of alkali reactant in a spray zone in the spray dryer to react sulfur dioxide with the alkali, conveying the flue gas and dried alkali-sulfur dioxide reaction products, unreacted alkali reactant and flyash to a dust collection system, collecting the particulate solids, transporting the particulate solids to a splitter apparatus and separating the particulate solids into a recycle stream and a disposal stream, and conveying the particulate solids recycle stream to the spray dryer.

* * * * *